US00RE38948E

(19) United States
(12) Reissued Patent
Redman et al.

(10) Patent Number: US RE38,948 E
(45) Date of Reissued Patent: Jan. 31, 2006

(54) HAND AND FOREARM PROTECTOR

(75) Inventors: Rhonda S. Redman, Fridley, MN (US); Ricky V. Redman, 98 - 64th Way, Fridley, MN (US) 55432

(73) Assignee: Ricky V. Redman, River Falls, WI (US)

(21) Appl. No.: 09/519,889

(22) Filed: Mar. 6, 2000

Related U.S. Patent Documents

Reissue of:
(64) Patent No.: 5,878,435
Issued: Mar. 9, 1999
Appl. No.: 08/968,977
Filed: Nov. 12, 1997

U.S. Applications:
(60) Provisional application No. 60/046,481, filed on May 14, 1997.

(51) Int. Cl.
*A41D 19/00* (2006.01)

(52) U.S. Cl. ..... 2/16; 2/159; 2/162
(58) Field of Classification Search ..... 2/16, 2/159, 162, 161.6, 170, 59, 125, 126, 163, 2/269, 270, 169
See application file for complete search history.

(56) References Cited

U.S. PATENT DOCUMENTS

| | | | | | |
|---|---|---|---|---|---|
| 363,829 | A | * | 5/1887 | Jennings | |
| 622,688 | A | * | 4/1899 | Horn | |
| 906,856 | A | * | 12/1908 | Bernard | |
| 2,904,792 | A | * | 9/1959 | Elliott | 2/16 |
| 3,000,378 | A | * | 9/1961 | Zieman | 128/165 |
| 3,559,640 | A | | 2/1971 | Beckett | 128/94 |
| 4,011,596 | A | | 3/1977 | Chang | 2/16 |
| 4,473,614 | A | | 9/1984 | Hockmeyer | 428/248 |
| D290,766 | S | | 7/1987 | Pierce, Jr. | D29/20 |
| 4,765,319 | A | | 8/1988 | Finnieston et al. | 128/87 |
| D299,562 | S | * | 1/1989 | Lee | D29/20 |
| D300,676 | S | | 4/1989 | Pierce, Jr. | D29/20 |
| 4,868,927 | A | | 9/1989 | Bourdeau et al. | 2/161 |
| 4,967,419 | A | * | 11/1990 | Elliott | 2/16 |
| 5,070,541 | A | * | 12/1991 | Goss | 2/16 |
| 5,073,988 | A | * | 12/1991 | Lewis, Jr. et al. | 2/162 |
| 5,173,966 | A | * | 12/1992 | DeLeo | 2/168 |
| 5,402,536 | A | | 4/1995 | Matthews | 2/16 |
| 5,526,531 | A | | 6/1996 | Olson et al. | 2/16 |
| 5,873,968 | A | | 2/1999 | Pike et al. | 128/87 |

* cited by examiner

*Primary Examiner*—Rodney M. Lindsey
(74) *Attorney, Agent, or Firm*—Westman, Champlin & Kelly, P.A.

(57) ABSTRACT

A hand and forearm protector having a sleeve with a primary opening at one end and at another end a discrete finger opening and a discrete thumb opening also includes a longitudinal opening disposed along the sleeve. The longitudinal opening extends from a point directly adjacent a juncture of the carpal bones and the radius of a hand of the wearer and extends rearwardly along an forward side of the forearm approximately to the primary opening at the end of the sleeve. A zipper is included that extends from the juncture of the sleeve that overlies the carpal bones and radius and the zipper extends rearwardly to the end of the sleeve for bringing the edges of the sleeve together to conform the sleeve to the forearm of the wearer.

4 Claims, 5 Drawing Sheets

HAND AND FOREARM PROTECTOR

Matter enclosed in heavy brackets [ ] appears in the original patent but forms no part of this reissue specification; matter printed in italics indicates the additions made by reissue.

*CROSS REFERENCE TO RELATED APPLICATION*

*Applicant claims the priority date of U.S. Provisional Application 60/046,481.*

BACKGROUND OF THE INVENTION

The present invention relates to hand and forearm protectors, and in particular, it relates to a hand and forearm protector that is also visually appealing.

Coverings for the hand and forearm or for the forearm or hand individually are well known. There are numerous reasons why such hand and forearm protectors are used. Some of these reasons relate to protection in athletics, for example, linemen wear forearm protectors in football or in-line skaters wear hand and wrist guards. Hand and forearm protectors also are used for medical reasons as restraining devices such as to protect a sprained wrist. Additional, examples of hand and forearm protectors are found in the following U.S. patents.

| Inventor | U.S. Pat. No. |
|---|---|
| Chang | 4,011,596 |
| Finnieston et al. | 4,765,319 |
| Finnieston et al. | 4,873,968 |
| Elliot | 4,967,419 |
| Matthews | 5,402,536 |
| Olson et al. | 5,526,531 |
| Pierce, Jr. | Des. 290,766 |
| Pierce, Jr. | Des. 330,676 |

BRIEF SUMMARY OF THE INVENTION

The present invention includes a hand and forearm protector having a sleeve. The sleeve has a primary opening at one end and at another end a discrete finger opening and a discrete thumb opening. A longitudinal opening is disposed along the sleeve and extends from a point directly proximal a juncture of the carpal bones and the radius of a hand of the wearer rearwardly along a foreword side of the forearm to approximately the end of the sleeve. A closure mechanism, preferably a zipper, extends from the point of the sleeve overlying the juncture of the carpal bones and radius rearwardly to the end of the sleeve for bringing the edges of the sleeve together to conform the sleeve to the forearm of the wearer.

DETAILED DESCRIPTION OF THE PREFERRED EMBODIMENTS

Figure 1:
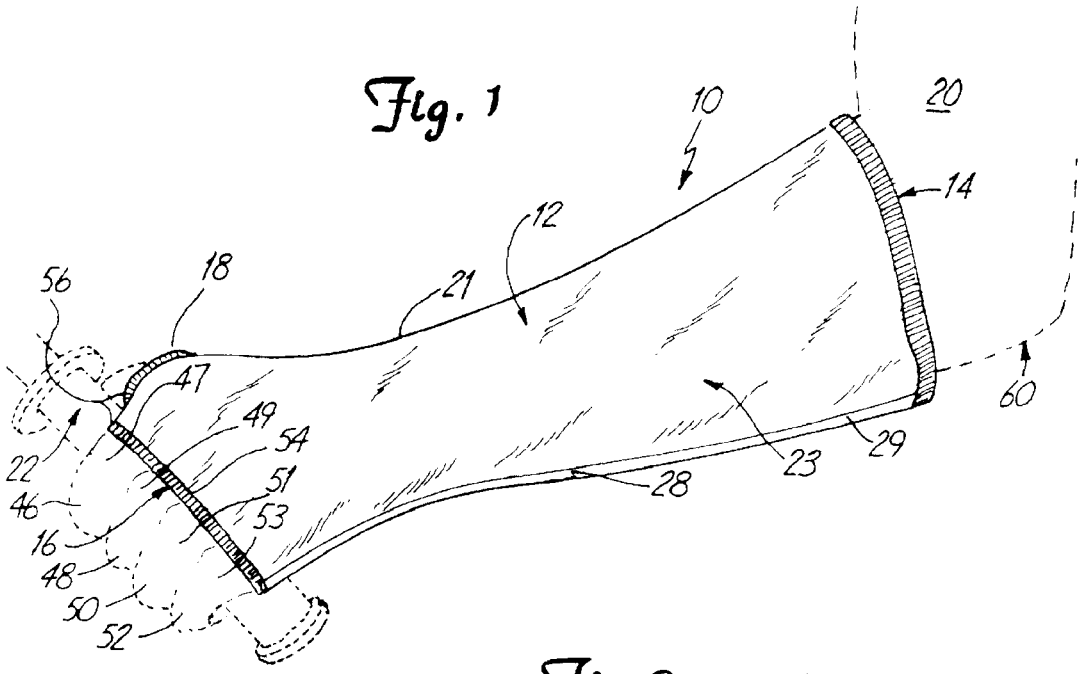
FIG. 1 is a perspective view of the forearm protector of the present invention.

The hand and forearm protector of the present invention is generally illustrated at 10 in FIGS. 1–9. The hand and forearm protector 10 is used to cover and protect a proximal portion of a hand 21 and an entire forearm 23 of a motorcycle driver 20 when riding and gripping handlebars 22 of a motorcycle (not illustrated). The hand and forearm protector 10 is also designed to be worn as a decorative piece of clothing and as such its use is not limited to driving motorcycles.

Figure 2:
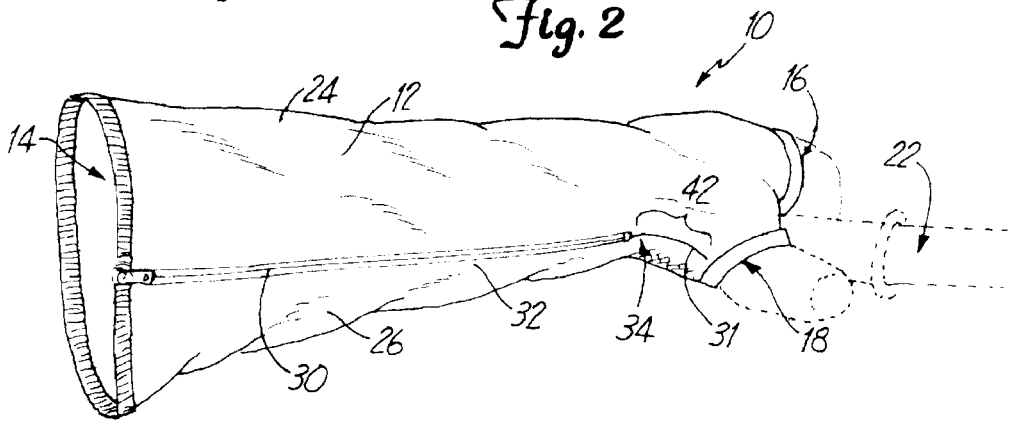
FIG. 2 is a perspective view from a different angle of the forearm protector.

As best illustrated in FIGS. 1 and 2, the hand and forearm protector 10 includes a sleeve portion 12 having at one end a forearm opening 14 and at another end a discrete digit opening 16 and a discrete thumb opening 18. The thumb opening 18 is an opening that is discrete from and separate from the digit opening 16. The openings 16 and 18 are separated by a section 56 of the sleeve 12. The sleeve also includes a longitudinal opening 19 that overlies a forward forearm portion. By forward forearm is meant that portion of the forearm that faces forward when the arms are left to hang naturally and loosely along side the body.

The sleeve 12 of the hand and forearm protector 10 is made of a flexible continuous piece of fabric sewn to create a cylindrical-type structure into which the hand 21 is inserted along with the entire forearm 23 of the wearer 20. The sleeve 12 may be made of any suitable fabric that is pliable, wear resistant and suitable for use outdoors. A preferred material is leather although other materials suitable or popular for outdoor use are included within the scope of the present invention.

Figure 5:
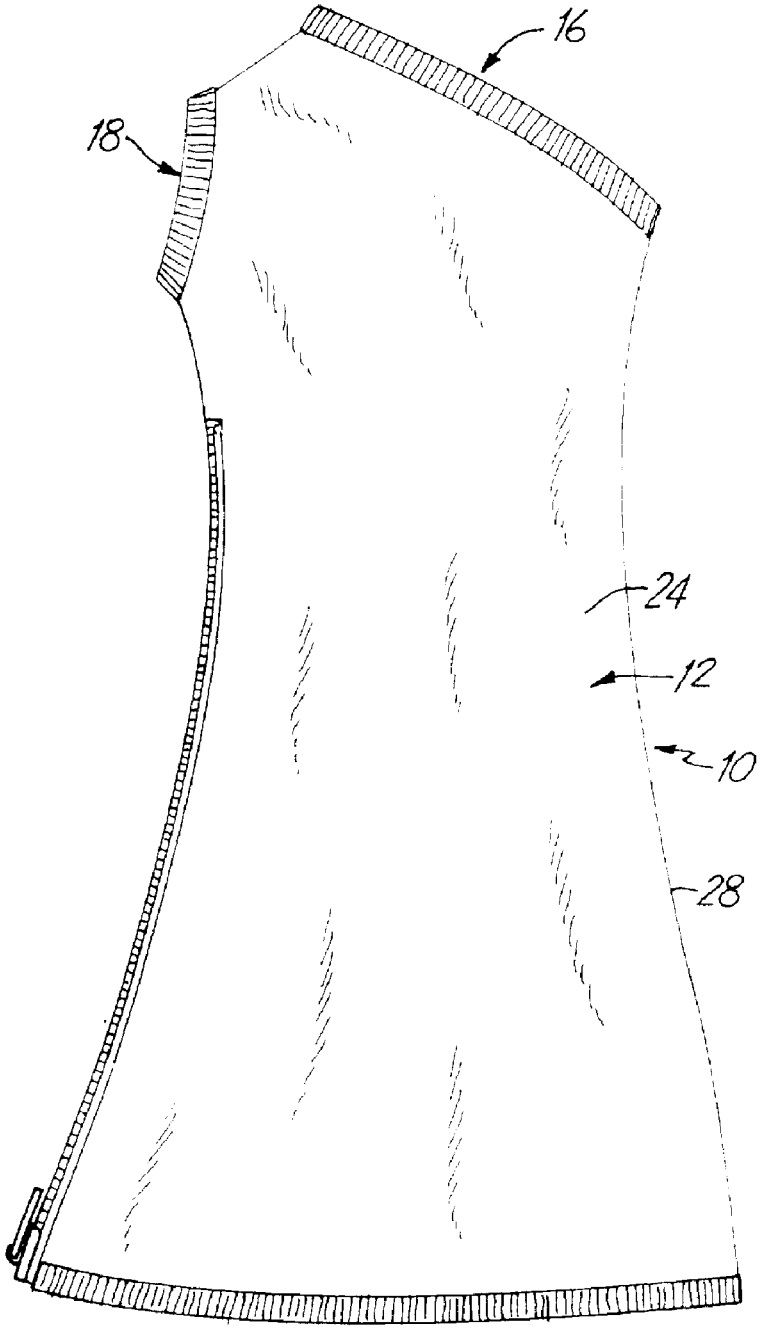
FIG. 5 is a top plan view of the forearm protector.
Figure 6:
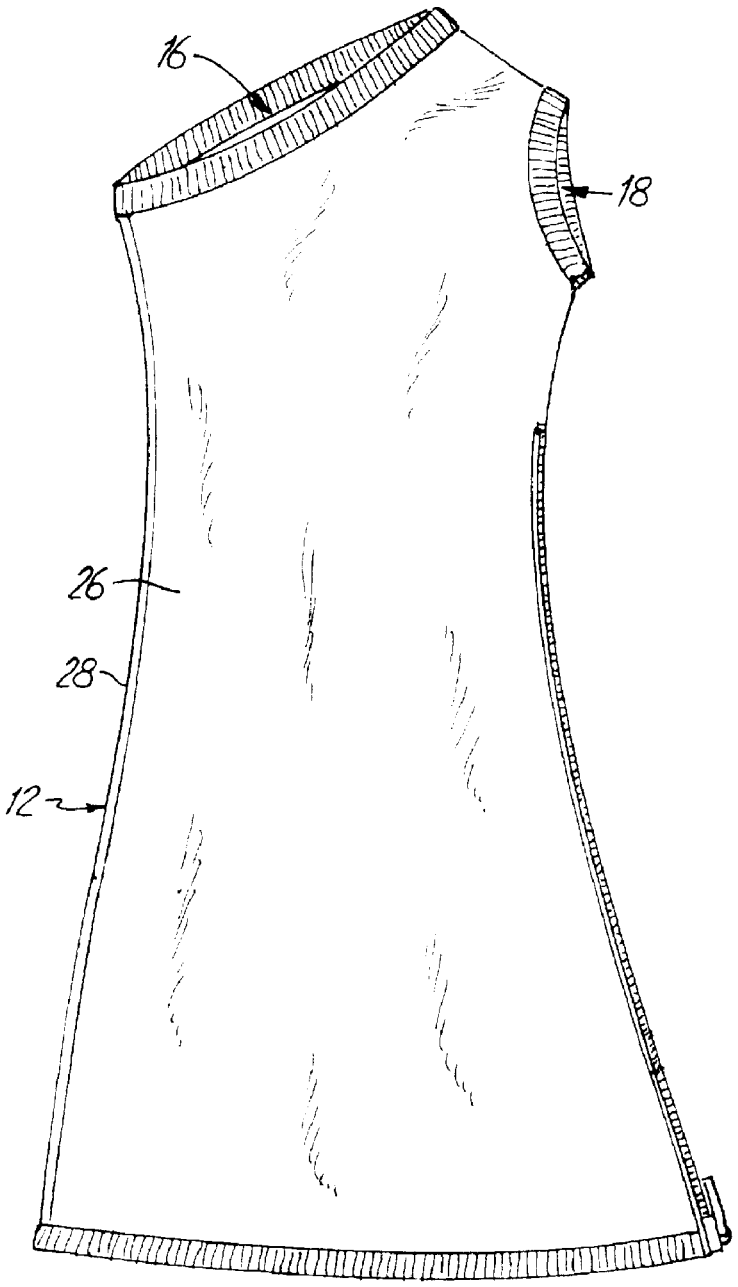
FIG. 6 is a bottom plan view of the forearm protector.
Figure 7:
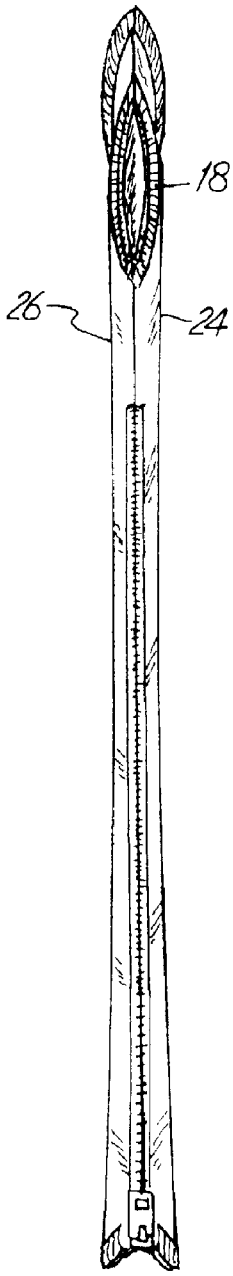
FIG. 7 is a right side plan view of the forearm protector.
Figure 8:
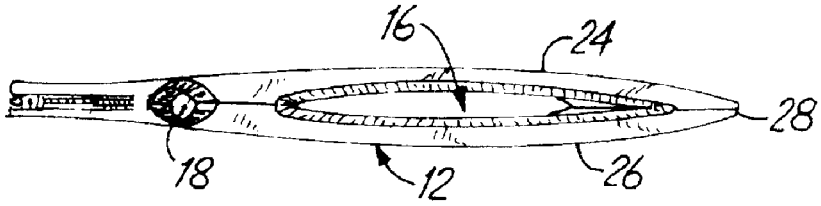
FIG. 8 is a front plan view.
Figure 9:
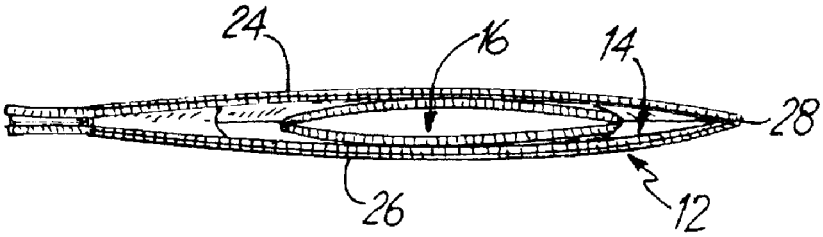
FIG. 9 is a rear plan view.

For purposes of description in this application, the surface of the sleeve 12 is divided into an outer surface segment 24 and an inner surface segment 26 joined at a rearward surface segment 28. The outer surface segment faces away from the body when the arms are left to hand naturally and loosely along side the body while the inner segment faces the body. Similarly, the rearward surface segment 28 covers a rearward portion of the forearm 23. The sleeve 12 has a continuous uninterrupted surface through the outer segment 24, the inner segment 26 and the rearward segment surface segment 28 as illustrated in the Figures. The sleeve 12 extends away from the hand, to approximately 1 to 1½ inches from the wearers elbow 60, as best illustrated in FIG. 1. In one preferred embodiment, the sleeve 12 is made of two distinct pieces of leather, joined by sewing along a line 29 that extends along the entire length of the sleeve as best illustrated in FIG. 1, and sewn along a line 33 between the thumb opening 18 and digit opening 16, as best illustrated in FIGS. 5 and 6, and sewn along a line 31 that extends from the thumb opening 18 to the longitudinal opening 19.

A zipper 32 is provided to open and close the opening 19. The zipper is positioned to start at a point 34 on the sleeve that is directly adjacent rearwardly of the ball of the thumb which is sometimes referred to as the thenar muscle. In relation to bone structure, this position may also be defined as ajuncture of the carpal bones and radius. The sleeve is sewn along the line 31 such that the sleeve conforms in a snug fashion to the ball of the thumb.

The longitudinal opening 19 extends from this position to the end of the sleeve at the forearm opening 14 to permit inserting the hand of the water into the forward portion of the sleeve and once inserted, the zipper 32 is closed to conform the sleeve to the wearer's forearm. The zipper 32 when in a closed position brings an upper edge 38 of the segment 24 and a lower edge 40 of the segment 26 together to conform the sleeve 12 to the forearm 23 of the wearer 20 in a form-fitting fashion.

Figure 3:
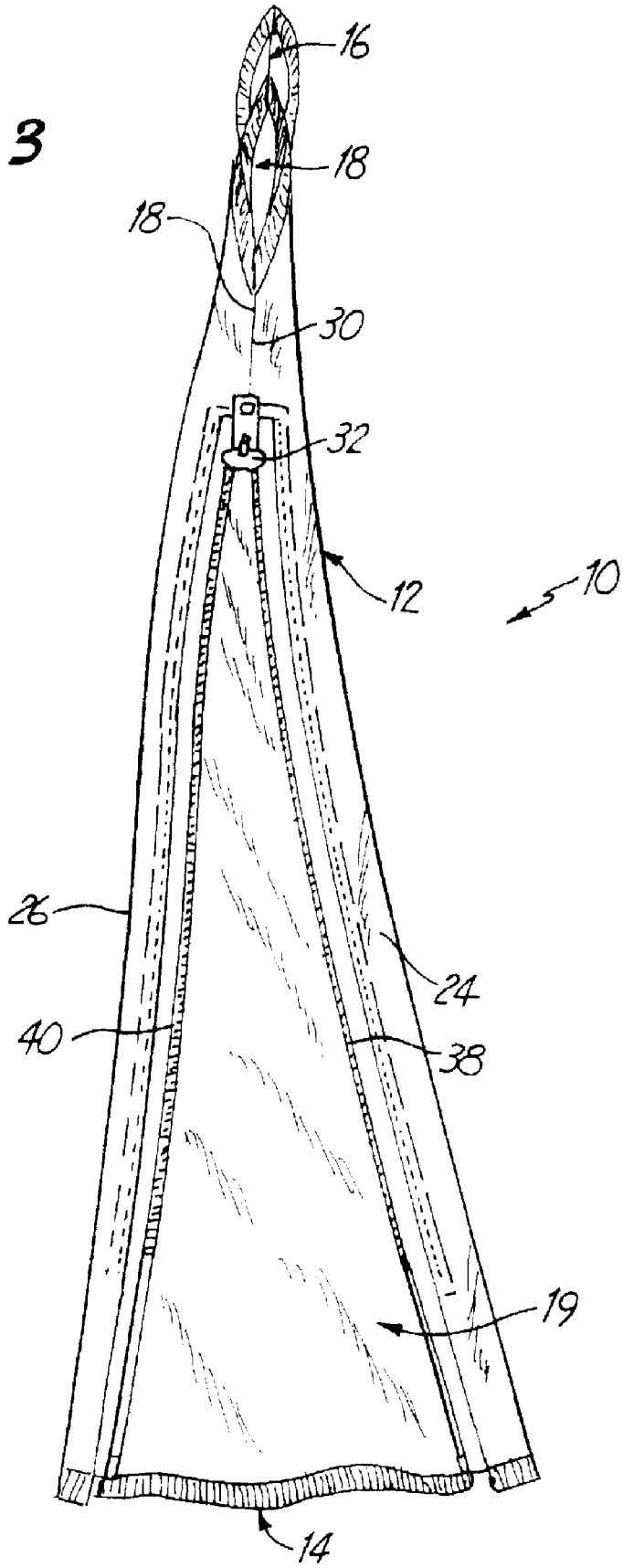
FIG. 3 is a side view of the forearm protector with a zipper in an open position.
Figure 4:
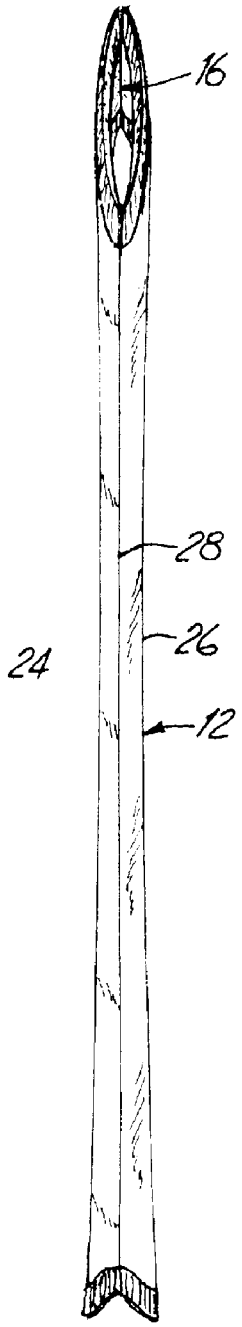
FIG. 4 is a left side plan view of the forearm protector.

To insert the hand and forearm into the forearm protector of the present invention, the zipper 32 is positioned in an open position as illustrated in FIG. 3 which permits opening 19 to widen. An inner flap section 44 triangular in configuration is attached along one edge to an inner surface of the segment 26 and at another edge to an inner surface of the segment 24. The flap 44 is disposed such that its apex is proximate the ball of the thumb while its base is disposed proximate the forearm opening 14. The flap section 44 protects the user's forearm from being pinched by the zipper 32 when the slide of the zipper 32 is moved.

The digit opening 16 is sufficiently wide for all four fingers 46, 48, 50 and 52 to extend therethrough. The opening 16 includes an edge 54 which encircles all four fingers as a unit. The sleeve 12 of the hand and forearm protector extends up to each fingers' a first set of joints or knuckles 47, 49, 51 and 53. The first set of joints of the fingers 46, 48, 50 and 52 are defined as those joints or knuckles that are formed at the articulation of the metacarpal bone and the phalange of each finger. The sleeve 12 does not extend over the joints or knuckles 47, 49, 51 and 53 thereby exposing those knuckles as best illustrated in FIG. 1 wherein the edge 54 lies directly adjacent to the exposed knuckles 47, 49, 51 and 53.

Similarly, the thumb opening 18 has an edge 55 that is disposed to extend the sleeve to a position such that the first joint or knuckle of the thumb that is formed between the metacarpal bone and the phalange is exposed.

It will be appreciated that the position of the zipper 32, that is along an inner section of the forearm, permits the application of decorative designs along the outer segment 24, the rearward segment 28 and the inner segment 26. Indicia such as designs and other decorative features may be placed on the sleeve without interference or interruption by closure of fastening mechanisms that are found in prior art forearm protectors. The tight fit or conformance to the proximal portion of the hand exposing all of the knuckles of the hand and thumb is very visually pleasing.

Although the present invention has been described with reference to preferred embodiments, workers skilled in the art will recognize that changes may be made in form and detail without departing from the spirit and scope of the invention.

We claim:

1. A hand and forearm protector comprising:

a sleeve for overlying a forearm and a proximal hand portion of a wearer;

a primary opening at one end of the sleeve;

a *single* discrete digit opening disposed at another end of the sleeve wherein [the sleeve extends past the set of joints of the metacarpals and the phalanges to a point adjacent a first set of joints of the phalanges which are adjacent to the set of joints of the metacarpals and the phalanges of the wearer's fingers leaving the joints of the phalanges exposed] *all of the wearer's fingers extend therethrough, wherein the sleeve extends to a point adjacent a first set of knuckles of the wearer's fingers, leaving the knuckles exposed*;

a discrete thumb opening disposed at another end of the sleeve [wherein the sleeve extends beyond the joint of the phalanges and first metacarpal and is adjacent to the joint of the phalanges leaving this joint exposed] *wherein the sleeve extends to the joint of the thumb closest to the fingertip leaving the joint exposed*;

a longintudinal opening along the sleeve extending adjacent from a point that overlies a juncture of the carpal bones and the radius and extending rearwardly towards the primary opening to proximately the end of the sleeve; and a zipper for closing the longitudinal opening to conform the sleeve to the forearm of the wearer, the closure being disposed to overlie a forward site of the forearm.

2. The protector of claim 1 and further including a protective flap that extends between edges of the opening protecting the wearer from being pinched by the zipper.

3. The protector of claim 1 wherein [the sleeve extends to] *the length of the sleeve is selected to extend to* approximately 1 to 1½ inches from an elbow of the wearer.

[4. The protector of claim 1 wherein the sleeve includes decorative indicia on an uninterrupted surface.]

*5. The protector of claim 1 wherein the sleeve extends to a point adjacent a first knuckle of the fingers and thumb, leaving the knuckles exposed.*

* * * * *